US008719573B2

(12) United States Patent  (10) Patent No.: US 8,719,573 B2
Ran et al.  (45) Date of Patent: May 6, 2014

(54) SECURE PEER DISCOVERY AND AUTHENTICATION USING A SHARED SECRET

(75) Inventors: Alexander S. Ran, Palo Alto, CA (US); Christopher Z. Lesner, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 27 days.

(21) Appl. No.: 13/360,422

(22) Filed: Jan. 27, 2012

(65) Prior Publication Data

US 2013/0198518 A1   Aug. 1, 2013

(51) Int. Cl.
*H04L 29/06* (2006.01)
(52) U.S. Cl.
USPC .......................................................... 713/170
(58) Field of Classification Search
USPC ...................... 713/170, 153; 726/2
See application file for complete search history.

(56) References Cited

U.S. PATENT DOCUMENTS

| 7,240,202 B1* | 7/2007 | Orman ........................ 713/169 |
| 2011/0161660 A1* | 6/2011 | Zhang et al. .................. 713/156 |
| 2012/0124375 A1* | 5/2012 | Truskovsky et al. .......... 713/168 |

* cited by examiner

*Primary Examiner* — Ali Abyaneh
(74) *Attorney, Agent, or Firm* — Park, Vaughan, Fleming & Dowler LLP; Steven E. Stupp

(57) ABSTRACT

During a security technique, an electronic device determines a name by a applying a function to a shared secret, which is shared between a user and another user. This name is advertised in a network. After discovery by another electronic device (which is associated with the other user), the electronic device generates a first encrypted message from an unencrypted message using a cryptographic key. The electronic device provides the first encrypted message to the other electronic device, and receives a second encrypted message from the other electronic device. Using the cryptographic key, the electronic device decrypts the second encrypted message. Moreover, the electronic device receives confirmation that the other electronic device was able to decrypt the first encrypted message, thereby authenticating that the secure connection has been established.

19 Claims, 4 Drawing Sheets

SECURE PEER DISCOVERY AND AUTHENTICATION USING A SHARED SECRET

BACKGROUND

The present disclosure relates to techniques for discovering and authenticating a peer based on a shared secret to establish a secure connection between electronic devices.

Financial legal transactions, for example involving reservations, quotes, payments, agreements and contracts, are often performed during face-to-face interactions. In principle, portable electronic devices, such as smartphones and tablet computers, can be useful tools in facilitating these interactions. For example, cellular telephones can be used to digitally capture content during an interaction, and then seamlessly integrate the content into backend systems, such as: legal or financial management systems, payment networks or banking systems.

However, in order to use portable electronic devices to facilitate face-to-face interactions, a secure communication typically has to be established between the participants' portable electronic devices. Usually, the portable electronic devices first need to find or discover each other. In order to be discoverable in a communication network, a portable electronic device or service typically needs to be advertised. This advertising may be achieved using a form of broadcast to all peers. Furthermore, advertising usually includes network-specific connection parameters of the advertising portable electronic device or service and a name that can be recognized by peer portable electronic devices, services, and/or their users.

In cases when there is no pre-existent trust relationship between the users or their portable electronic devices, there is no general mechanism that allows the peers to recognize each other and to establish a secure communication. When this occurs, a secure sessions can be established using a trusted third party. However, this can be problematic. In particular, the parties may not have a shared trusted third party, or the trusted third party may not be readily accessible at the time of the transaction (i.e., when the parties want to establish the secure connection).

Another possibility is to establish a direct peer-to-peer connection between the portable electronic devices. In order to establish a peer-to-peer connection between two portable electronic devices, the portable electronic devices need to be able to discover and authenticate each other. However, existing techniques for establishing secure communication between portable electronic devices are often cumbersome and/or impractical. For example, many techniques leverage trust between the participants or an offline certification authority. But these approaches may not be suitable when the participants have no prior direct or indirect trust relationship.

Alternatively, secure communication can be implemented using physical security, for example, by coupling the portable electronic devices using a physical cables, and restricting communication to just physically secured connections. However, this is often cumbersome and impractical due to absence of a universal cable to connect arbitrarily selected portable electronic devices.

In addition, several existing techniques for establishing a secure connection between portable electronic devices leverage additional capabilities, such as absolute time and location measurements, which are not available on all portable electronic devices, and which may not have sufficient resolution to reliably establish the secure connection. Techniques have also been proposed based on proximity of the portable electronic devices and shared information in the physical environment, such as images of bar-codes or audible information. However, these proposed techniques are complicated, and may be vulnerable to security breaches by a third party who intercepts the shared information.

This lack of lack of reliability and the usability problems make it difficult for users to conduct transactions via portable electronic devices.

SUMMARY

The disclosed embodiments relate to how electronic devices can securely discover and pair with each other in order to establish secure communication. In order for the secure communication to occur, the electronic devices must recognize each other as possessing the same shared secret using available unsecure broadcast methods without actually revealing the shared secret. Using the disclosed technique, an electronic device computes a cryptographic transformation (such as a one-way cryptographic transformation) of the shared secret to generate a message that is then publically broadcast. When this message is broadcast, other electronic devices, using the one-way cryptographic transform and having the same shared secret, are able to recognize the broadcaster of the message as having the same shared secret, and can initiate secure communication using that shared secret as the encryption key. However, electronic devices that do not possess the same shared secret are unable to complete this handshake-pairing process. Thus, the disclosed technique facilitates peer-to-peer discovery and authentication in a communication network using a shared secret.

In general, all wireless networks offer some form of peer or service discovery. However, in order for peers to discover each other, they need to advertise an attribute they can recognize as the attribute of the peer. In the disclosed technique, the only thing known to the peers is the shared secret they have previously shared. This shared secret cannot be advertised because then it will lose its value as a secret and will become known to all with the access to the communication channel. This problem can be overcome with the aid of one-way cryptographic functions (i.e., functions that are easy to compute but are hard to invert such as cryptographic hash functions). Using this approach, both peers can compute a hash value of the shared secret, h=HASH(s), and can advertise it for peer discovery by, for example, embedding it in a Bluetooth™ friendly name in Bluetooth™ (from the Bluetooth Special Interest Group of Kirkland, Wash.) or SSID in WiFi™ (from the Wi-Fi Alliance of Austin, Tex.). This solves the discovery problem without compromising the shared secret.

However other parties can easily replicate this behavior. Therefore, an authentication operation may also be used. Fortunately, the secret shared can also be used for authentication. In particular, both peers may construct encrypted messages using the shared secret as the encryption key to encode a random or a pseudorandom number of their choosing, for example, using a symmetric encryption technique that is known to both peers. Moreover, the message may include other elements to prevent replay attacks and other common security threats in wireless communication channels. Then, the peers exchange the messages with the each other. Next, each of the peers replies with a message that proves the ability to decrypt the earlier received message thereby completing the authentication operation.

Thus, the peers can use the shared secret to discover and authenticate each other, and then can use a zero knowledge protocol (such as, for example, Diffie-Hellman key exchange) to establish a secure session over the agreed upon communication channel. In this way, after advertising their presence and availability for pairing, confidential communication is established between the paired electronic devices.

Therefore, during the disclosed technique, an electronic device determines a name by a applying a function (such as a one-way function) to a shared secret, which is shared between a user and another user. This name is advertised in a network. After receiving confirmation of discovery by another electronic device (which is associated with the other user), the electronic device generates a first encrypted message from an unencrypted message using a cryptographic key (such as a one-way cryptographic key). The electronic device provides the first encrypted message to the other electronic device, and receives a second encrypted message from the other electronic device. Using the cryptographic key, the electronic device decrypts the second encrypted message. Moreover, the electronic device receives confirmation that the other electronic device was able to decrypt the first encrypted message, thereby authenticating that the secure connection has been established.

In some embodiments, prior to determining the name, the electronic device exchanges the shared secret with the other electronic device. Furthermore, the shared secret may be exchanged using a different communication technique than that used during the advertising, receiving and providing operations.

Additionally, the confirmation of discovery may include a request to establish the secure connection with the other electronic device.

Thus, the electronic device may perform discovery with a peer in the network by advertising based on the shared secret. Then, the users (or their electronic devices) may authenticate each other (that is they verify that the discovered peer indeed possesses the shared secret) by exchanging messages encrypted with a cryptographic key (which may be derived from the shared secret) using an encryption technique known to both of the users.

Note that the cryptographic key may be determined from the shared secret using a function (such as a one-way hash function) that transforms the shared secret. This function may be agreed to by the user and the other user.

In some embodiments, generating the first encrypted message involves a symmetric encryption technique.

Moreover, the secure connection may include a peer-to-peer connection between the electronic device and the other electronic device associated with the other user.

Furthermore, the unencrypted message may include a random number and/or a pseudorandom number.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
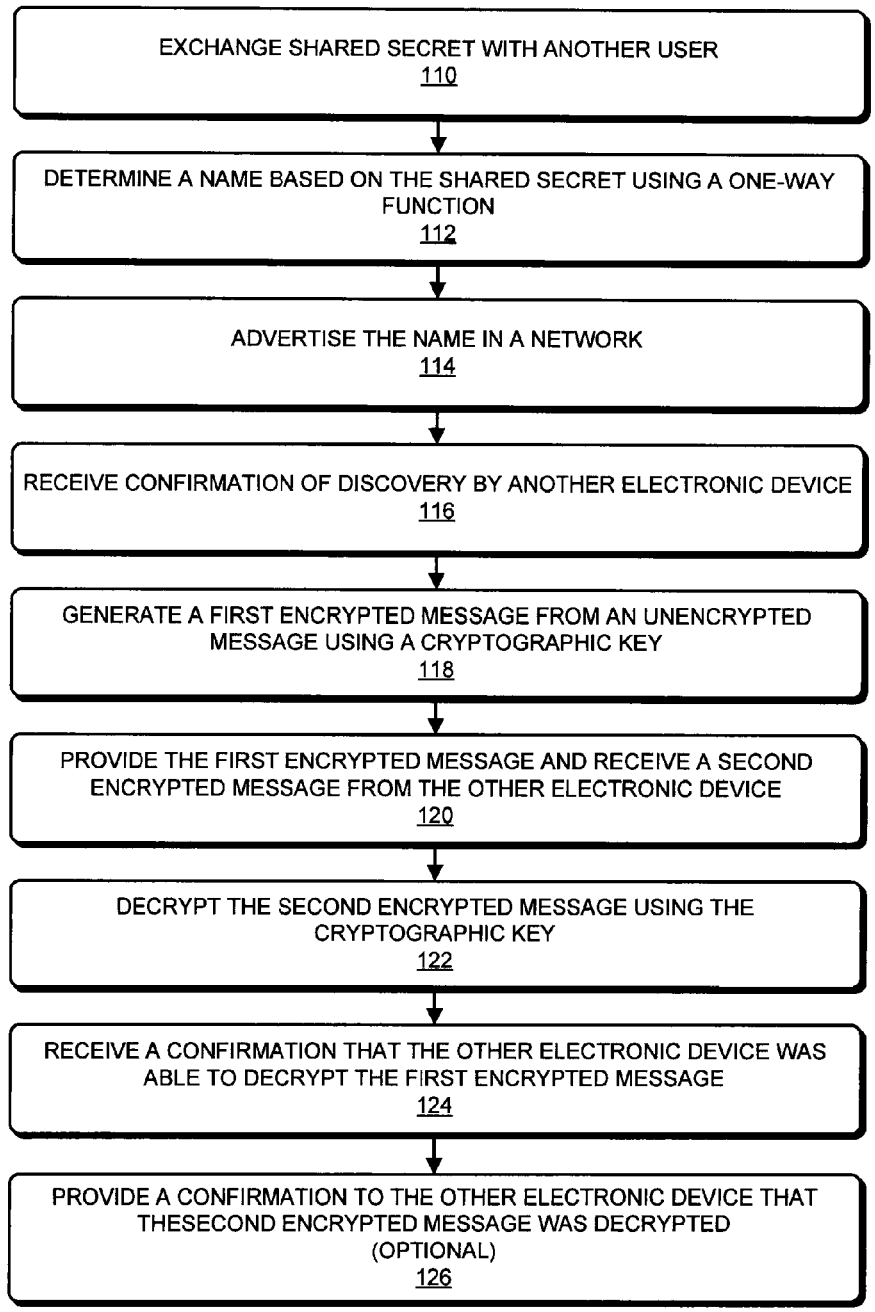
FIG. 1 is a flow chart illustrating a method for establishing a secure connection in accordance with an embodiment of the present disclosure.

Embodiments of an electronic device, a technique for establishing a secure connection, and a computer-program product (e.g., software) for use with the electronic device are described. During the security technique, an electronic device determines a name by a applying a function to a shared secret, which is shared between a user and another user. This name is advertised in a network. After discovery by another electronic device (which is associated with the other user), the electronic device generates a first encrypted message from an unencrypted message using a cryptographic key. The electronic device provides the first encrypted message to the other electronic device, and receives a second encrypted message from the other electronic device. Using the cryptographic key, the electronic device decrypts the second encrypted message. Moreover, the electronic device receives confirmation that the other electronic device was able to decrypt the first encrypted message, thereby authenticating that the secure connection has been established.

By facilitating the secure connection, the security technique may improve usability and increase user confidence in conducting transactions via electronic devices. As a consequence, this security technique may lead to increasing commercial activity.

In the discussion that follows, a recipient, an entity, an owner, a user or a customer may include: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

We now describe embodiments of the security technique, which may be performed by a system (such as system 300 in FIG. 3) and/or an electronic device (such as electronic device 400 in FIG. 4) in this system. This security technique facilitates secure discovery and pairing of electronic devices with each other in order to establish secure communication. In order for the secure communication to occur, the electronic devices must recognize each other as possessing the same shared secret using available unsecure broadcast methods without actually revealing the shared secret. Using the disclosed technique, an electronic device computes a cryptographic transformation (such as a one-way cryptographic transformation) of the shared secret to generate a message that is then publically broadcast. When this message is broadcast, other electronic devices, using the one-way cryptographic transform and having the same shared secret, are able to recognize the broadcaster of the message as having the same shared secret, and can initiate secure communication using that shared secret as the encryption key. However, electronic devices that do not possess the same shared secret are unable to complete this handshake-pairing process. Thus, the disclosed technique facilitates peer-to-peer discovery and authentication in a communication network using a shared secret.

In general, all wireless networks offer some form of peer or service discovery. However, in order for peers to discover each other, they need to advertise an attribute they can recognize as the attribute of the peer. In the disclosed technique, the only thing known to the peers is the shared secret they have previously shared. This shared secret cannot be advertised because then it will lose its value as a secret and will become known to all with the access to the communication channel. This problem can be overcome with the aid of one-way cryptographic functions (i.e., functions that are easy to compute but are hard to invert such as cryptographic hash functions). Using this approach, both peers can compute a hash value of the shared secret, h=HASH(s), and can advertise it for peer discovery by, for example, embedding it in a Bluetooth™ friendly name in Bluetooth™ (from the Bluetooth Special Interest Group of Kirkland, Wash.) or SSID in WiFi™ (from the Wi-Fi Alliance of Austin, Tex.). This solves the discovery problem without compromising the shared secret.

However other parties can easily replicate this behavior. Therefore, an authentication operation may also be used. Fortunately, the secret shared can also be used for authentication. In particular, both peers may construct encrypted messages using the shared secret as the encryption key to encode a random or a pseudorandom number of their choosing, for example, using a symmetric encryption technique that is known to both peers. Moreover, the message may include other elements to prevent replay attacks and other common security threats in wireless communication channels. Then, the peers exchange the messages with the each other. Next, each of the peers replies with a message that proves the ability to decrypt the earlier received message thereby completing the authentication operation.

Thus, the peers can use the shared secret to discover and authenticate each other, and then can use a zero knowledge protocol (such as, for example, Diffie-Hellman key exchange) to establish a secure session over the agreed upon communication channel. In this way, after advertising their presence and availability for pairing, confidential communication is established between the paired electronic devices.

FIG. 1 presents a flow chart illustrating a method 100 for establishing a secure connection. During operation, the electronic device (or a user associated with the electronic device) exchanges a shared secret with another user or peer (or another electronic device associated with the other user) (operation 110). Note that the shared secret may be exchanged using a different communication technique than that used during subsequent operations in method 100. For example, the users may verbally communicate the shared secret. In some embodiments, the shared secret may be a birthday, a telephone number, a gesture or an arbitrary piece of information known to the user and the other user (such as something the user and/or the other user tell each other). Then, the electronic device determines a name based on the shared secret using a one-way function (operation 112). Moreover, electronic device advertises (or broadcasts) the name in a network (operation 114), thereby facilitating peer discover.

During this discovery process, the electronic device may broadcast the derived name and may listen for attempts to connect. Alternatively, the electronic device may listen for the other electronic device to broadcast the derived name and, if so, the electronic device may attempt to connect with the other electronic device. This discovery process may continue when the other electronic device (or peer) discovers the electronic device or vice versa.

After receiving confirmation of discovery by the other electronic device (operation 116) (which may include a request to establish the secure connection with the other electronic device), the electronic device generates a first encrypted message from an unencrypted message (such as a random number and/or a pseudorandom number) using a cryptographic key (operation 118). For example, generating the first encrypted message may involve a symmetric encryption technique and/or the cryptographic key may be a one-way cryptographic key (which is a special instance of a so-called 'one-way function'). Note that the cryptographic key may be determined from the shared secret using a function (such as a one-way hash function, which is a special instance of a one-way function) that transforms the shared secret. This function may be agreed to by the user and the other user.

Then, the electronic device provides the first encrypted message to the other electronic device, and receives a second encrypted message from the other electronic device (operation 120). Using the cryptographic key, the electronic device decrypts the second encrypted message (operation 122). Moreover, the electronic device receives confirmation that the other electronic device was able to decrypt the first encrypted message (operation 124), thereby authenticating that the secure connection has been established.

Subsequently, the electronic devices may establish the secure connection (such as a peer-to-peer connection) using information in the first encrypted message and the second encrypted message. Furthermore, the secure connection may be established directly, i.e., without the user or the other user contacting a third party that establishes the secure connection.

In some embodiments, the electronic device optionally provides confirmation to the other electronic device that it was able to decrypt the second encrypted message (operation 126).

Thus, the electronic device may perform discovery with a peer in the network by advertising based on the shared secret. Then, the users (or their electronic devices) may authenticate each other (that is they verify that the discovered peer indeed possesses the shared secret) by exchanging messages encrypted with the cryptographic key (which may be derived from the shared secret) using an encryption technique known to both of the users.

Figure 2:
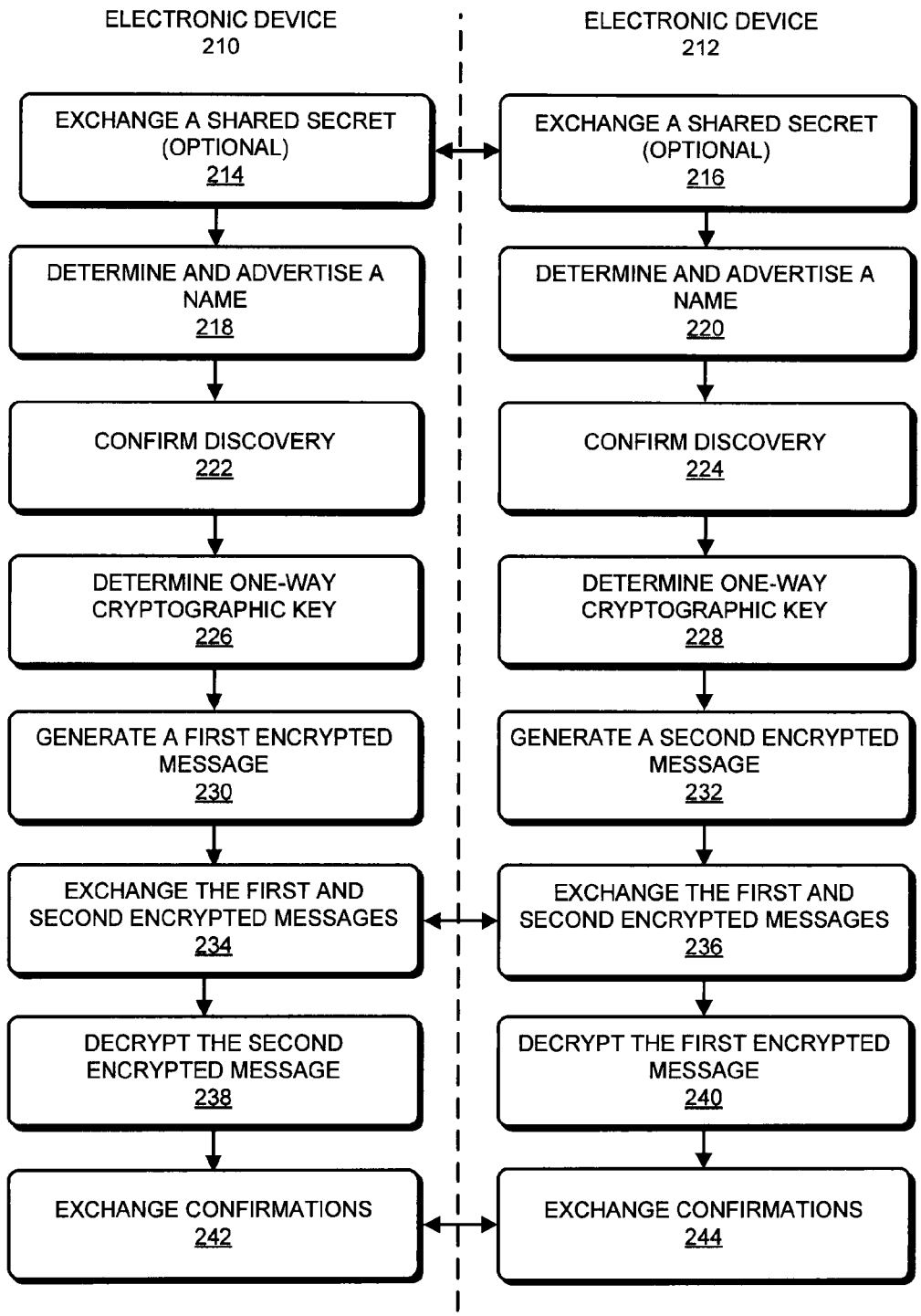
FIG. 2 is a flow chart illustrating the method of FIG. 1 in accordance with an embodiment of the present disclosure.

In an exemplary embodiment, the security technique is implemented using a one-way cryptographic key and two electronic devices (such as cellular telephones), which communicate using one or more communication techniques, including one which may be mediated using a network, such as a cellular-telephone network and/or the Internet. This is illustrated in FIG. 2, which presents a flow chart illustrating method 100 (FIG. 1). During this method, users of electronic devices 210 and 212 may optionally exchange a shared secret (operations 214 and 216) with each other. Alternatively, the shared secret may already be known to the users.

Then, electronic devices 210 and 212 may each determine and advertise a name (operations 218 and 220). This name may be determined by applying a function to the shared secret.

After electronic devices 210 and 212 have confirmed that they have discovered each other (operations 220 and 224) (for example, by receiving the name and/or a request to establish a secure connection), electronic devices 210 and 212 may determine a one-way cryptographic key based on the shared secret (operations 226 and 228). Moreover, electronic device 210 may generate a first encrypted message (operation 230) from an unencrypted message using the one-way cryptographic key, and electronic device 212 may generate a second encrypted message (operation 232) from the same or another unencrypted message using the one-way cryptographic key.

Next, electronic devices 210 and 212 may exchange, respectively, the first encrypted message (operation 234) and the second encrypted message (operation 236) with each other.

Using the one-way cryptographic key, electronic device 210 decrypts the second encrypted message (operation 238) and electronic device 212 decrypts the first encrypted message (operation 240). Next, electronic devices 210 and 212 exchange confirmations (operations 242 and 244) that the user and the other user were, respectively, able to decrypt the second encrypted message and the first encrypted message, thereby confirming that the secure connection (such as a peer-to-peer connection between electronic devices 210 and 212) has been established.

In some embodiments of method 100 (FIGS. 1 and 2), there may be additional or fewer operations. Moreover, the order of the operations may be changed, and/or two or more operations may be combined into a single operation.

In an exemplary embodiment, many wireless networks offer some form of peer or service discovery. For example, a discovery mechanism may utilize some form of attribute advertisement, such the Bluetooth™ friendly name in Bluetooth™ (from the Bluetooth Special Interest Group of Kirkland, Wash.) or SSID in WiFi™ (from the Wi-Fi Alliance of Austin, Tex.). In general, in order for peers to discover each other, they need to advertise an attribute that can be recognized as coming from a peer.

In the present security technique, the attribute is the shared secret (s). However, if the users advertise this shared secret, it will no longer be a secret, i.e., it will lose its value as a secret and it will become known to all users with access to the same wireless band. This problem is overcome using one-way functions, e.g., functions that can be readily computed but are usually hard to invert, such as cryptographic hash functions (for example, MD5 or SHA-1).

Using this approach, both users or peers can compute a hash value of the shared secret, h=HASH(s). Then, the peers can advertise the hash value for peer discovery, for example, by embedding it in a Bluetooth™ friendly name or SSID. This may address the discovery problem without compromising the shared secret.

However, this behavior can, in principle, be replicated by other parties. Therefore, an authentication operation may be performed. This authentication operation may be based on the same shared secret. In particular, both peers can construct encrypted messages using the shared secret as the encryption key. For example, the peers can encode a random number of their choosing according to technique (such as a symmetric encryption technique) that is known to both peers. These encrypted messages may be communicated between the peers in complete messages that may include other elements to prevent replay attacks and other security threats in wireless communication channels.

After receiving the complete message (including the encrypted message), a given one of the peers may decrypt the encrypted message and reply with a confirmation of the ability to decrypt the earlier received message, thereby completing the authentication operation and confirming that the secure connection (based on encryption using the encryption key) has been established.

In an exemplary embodiment, a one-way hash of the shared secret is computed by the electronic device. Then, a fixed length string is generated to be unique between the electronic devices. This fixed length string may be based on a one-way hash (which may be a specific instance of a so-called 'one-way function') of: the machine address code, the international mobile equipment identity, a pseudorandom number and/or a random number. Next, the hashed information and/or additional information is appended to each other and used to make the friendly name that is then broadcast.

If a friendly name with a greater sort order is detected by a given electronic device (which can be either of the electronic devices), an attempt to pair with it may be made using the shared secret for encryption. Otherwise, the given electronic device may wait for an incoming pairing attempt.

As described previously, the peers may use the shared secret to discover and authenticate each other and then use a zero knowledge protocol to establish the secure connection, for example, over a wireless communication channel.

Figure 3:
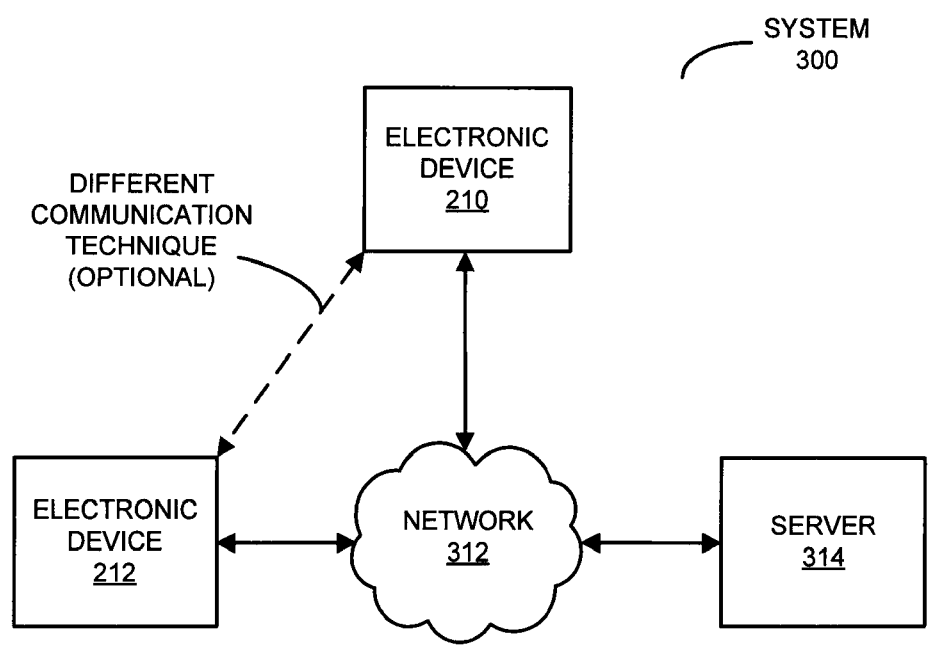
FIG. 3 is a block diagram illustrating a system that performs the method of FIGS. 1 and 2 in accordance with an embodiment of the present disclosure.

We now describe embodiments of the system and the electronic device, and their use. FIG. 3 presents a block diagram illustrating a system 300 that performs method 100 (FIGS. 1 and 2). In this system, a user of electronic device 210 may use an instance of a software product, such as a security software application that is resident on and that executes on electronic device 210. (Alternatively, the user may interact with a web page that is provided by server 314 via network 312, and which is rendered by a web browser on electronic device 210. For example, at least a portion of the security software application may be an application tool that is embedded in the web page, and which executes in a virtual environment of the web browser. Thus, the application tool may be provided to the user via a client-server architecture.) This security software application may be a standalone application or a portion of another application that is resident on and which executes on electronic device 210 (such as a software application that is provided by server 314 or that is installed and which executes on electronic device 210).

As discussed previously, the user may use the instance of the security software application on electronic device 210 to establish a secure connection with another user of electronic device 212. In particular, the users may have previously exchanged the shared secret. Subsequently, an instance of the security software application on electronic device 210 may apply a one-way function to the shared secret to determine a name. The instance of the security software application may advertise the name in network 312. An instance of the security software application on electronic device 212 may detect the name, and may communicate to electronic device 210 (via network 312) a confirmation that it has 'discovered' electronic device 210. This confirmation may include a request to establish a secure connection between electronic devices 210 and 212.

Then, the instance of the security software application on electronic device 210 may generate a first encrypted message from an unencrypted message using a cryptographic key (which may be derived from the shared secret). Similarly, the instance of the security software application on electronic device 212 may generate a second encrypted message from the same or another unencrypted message using the cryptographic key. Electronic devices 210 and 212 may then exchange the first encrypted message and the second encrypted message via network 312.

Using the cryptographic key, the instances of the security software application on electronic devices 210 and 212 may, respectively, decrypt the first encrypted message and the second encrypted message. Then, the instances of the security software application on electronic devices 210 and 212 may communicate confirmations to each other (via network 312) that the secure connection has been established.

Note that information in system 300 may be stored at one or more locations in system 300 (i.e., locally or remotely). Moreover, because this data may be sensitive in nature, it may be encrypted. For example, stored data and/or data communicated via network 312 may be encrypted.

Figure 4:
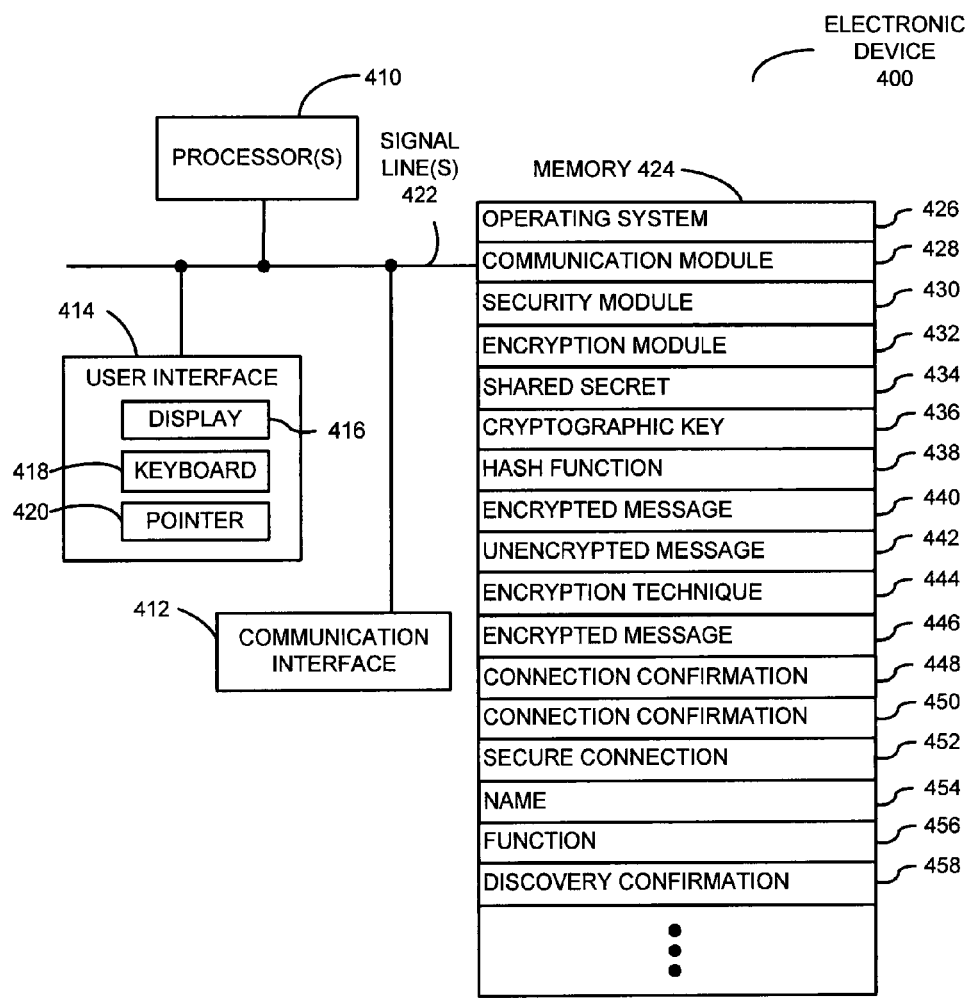
FIG. 4 is a block diagram illustrating an electronic device that performs the method of FIGS. 1 and 2 in accordance with an embodiment of the present disclosure.

FIG. 4 presents a block diagram illustrating an electronic device 400 that performs method 100 (FIGS. 1 and 2), such as server 212 (FIGS. 2 and 3). Electronic device 400 includes one or more processing units or processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in electronic device 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more electronic devices, computers and/or servers, including electronic devices, computers and/or servers that are remotely located with respect to electronic device 400.

Memory 424 may also include multiple program modules (or sets of instructions), including: security module 430 (or a set of instructions) and/or encryption module 432 (or a set of instructions). Note that one or more of these program modules (or sets of instructions) may constitute a computer-program mechanism.

During method 100 (FIGS. 1 and 2), security module 430 may optionally communicate or exchange shared secret 434 with another electronic device using communication module 428 and communication interface 412.

Then, security module 430 may determine a name 454 by applying a function 456 to shared secret 434. Moreover, security module 430 may advertise name 454 on a network using communication module 428 and communication interface 412. In response, the other electronic device may communicate a discovery confirmation 458 that name 454 has been received, which may be received by electronic device 400 using communication interface 412 and communication module 428. This discovery confirmation may include a request to establish a secure connection with electronic device 400.

Subsequently, encryption module 432 may generate an encrypted message 440 from an unencrypted message 442 using a one-way cryptographic key 436 and, for example, a symmetric encryption technique 444. Note that encryption module 432 may determine the one-way cryptographic key 436 based on shared secret 434, for example, using a one-way hash function 438.

This encrypted message may be provided by security module 430 to the other electronic device using communication module 428 and communication interface 412. Similarly, security module 430 may receive encrypted message 446 from the other electronic device using communication interface 412 and communication module 428.

Using one-way cryptographic key 436, encryption module 432 may decrypt encrypted message 446. Furthermore, security module 430 may provide (using communication module 428 and communication interface 412) connection confirmation 448 that electronic device 400 was able to decrypt encrypted message 446, and security module 430 may receive (using communication interface 412 and communication module 428) connection confirmation 450 that the other electronic device was able to decrypt encrypted message 440. In this way, electronic device 400 and the other electronic device may confirm that secure connection 452 has been established.

Instructions in the various modules in memory 424 may be implemented in: a high-level procedural language, an object-oriented programming language, and/or in an assembly or machine language. Note that the programming language may be compiled or interpreted, e.g., configurable or configured, to be executed by the one or more processors 410.

Although electronic device 400 is illustrated as having a number of discrete items, FIG. 4 is intended to be a functional description of the various features that may be present in electronic device 400 rather than a structural schematic of the embodiments described herein. In practice, and as recognized by those of ordinary skill in the art, the functions of electronic device 400 may be distributed over a large number of electronic devices, servers or computers, with various groups of the electronic devices, servers or computers performing particular subsets of the functions. In some embodiments, some or all of the functionality of electronic device 400 may be implemented in one or more application-specific integrated circuits (ASICs) and/or one or more digital signal processors (DSPs).

Electronic devices (such as electronic device 400), as well as electronic devices, computers and servers in system 300 (FIG. 3) may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 312 (FIG. 3) may include: the Internet, World Wide Web (WWW), an intranet, a cellular-telephone network, LAN, WAN, MAN, or a combination of networks, or other technology enabling communication between computing systems.

System 300 (FIG. 3) and/or electronic device 400 may include fewer components or additional components. Moreover, two or more components may be combined into a single component, and/or a position of one or more components may be changed. In some embodiments, the functionality of system 300 (FIG. 3) and/or electronic device 400 may be implemented more in hardware and less in software, or less in hardware and more in software, as is known in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic-device-implemented method for establishing a secure connection, the method comprising:

computing a first hash value of a shared secret, wherein the shared secret was previously shared between a user of the electronic device and an other user of an other electronic device;

computing a second hash value of at least one of a machine address code, an international mobile equipment identity, or a random number;

generating a friendly name based on the first hash value and the second hash value;

advertising the friendly name on a network, wherein the network includes the other electronic device;

receiving a first confirmation from the other electronic device that the friendly name was received by the other electronic device, wherein the first confirmation is sent by the other electronic device when the other electronic device detects that the received friendly name of the electronic device has a greater sort order than a corresponding friendly name of the other electronic device;

using the electronic device, generating a first encrypted message from an unencrypted message using a cryptographic key;

providing the first encrypted message to the other electronic device;

receiving a second encrypted message from the other electronic device;

decrypting the second encrypted message using the cryptographic key; and receiving a second confirmation that the other electronic device was able to decrypt the first encrypted message, thereby confirming that the secure connection has been established.

2. The method of claim 1, wherein, prior to the determining, the method further includes exchanging the shared secret with the other user.

3. The method of claim 2, wherein the shared secret is exchanged using a different communication technique than that used during subsequent operations in the method.

4. The method of claim 1, wherein the first confirmation includes a request to establish the secure connection with the other electronic device.

5. The method of claim 1, wherein determining the cryptographic key involves a hash function.

6. The method of claim 5, wherein the hash function was predefined by the user and the other user.

7. The method of claim 1, wherein generating the first encrypted message involves a symmetric encryption technique.

8. The method of claim 1, wherein the method further comprises providing a third confirmation to the other electronic device that the electronic device was able to decrypt the second encrypted message.

9. The method of claim 1, wherein the method further comprises determining the cryptographic key based on the shared secret.

10. A computer-program product for use in conjunction with an electronic device, the computer-program product comprising a non-transitory computer-readable storage medium and a computer-program mechanism embedded therein, to establish a secure connection, the computer-program mechanism including:

instructions for computing a first hash value of a shared secret, wherein the shared secret was previously shared between a user of the electronic device and an other user of an other electronic device;

instructions for computing a second hash value of at least one of a machine address code, an international mobile equipment identity, or a random number;

instructions for generating a friendly name based on the first hash value and the second hash value;

instructions for advertising the friendly name on a network, wherein the network includes the other electronic device;

instructions for receiving a first confirmation from the other electronic device that the friendly name was received by the other electronic device, wherein the first confirmation is sent by the other electronic device when the other electronic device detects that the received friendly name of the electronic device has a greater sort order than a corresponding friendly name of the other electronic device;

instructions for generating a first encrypted message from an unencrypted message using a cryptographic key;

instructions for providing the first encrypted message to the other electronic device;

instructions for receiving a second encrypted message from the other electronic device;

instructions for decrypting the second encrypted message using the cryptographic key; and instructions for receiving a second confirmation that the other electronic device was able to decrypt the first encrypted message, thereby confirming that the secure connection has been established.

11. The computer-program product of claim 10, wherein, prior to the instructions for determining, the computer-program mechanism further includes instructions for exchanging the shared secret with the other user.

12. The computer-program product of claim 11, wherein the shared secret is exchanged using a different communication technique than that used during the providing and receiving operations.

13. The computer-program product of claim 10, wherein the computer-program mechanism further includes instructions for providing a third confirmation to the other electronic device that the electronic device was able to decrypt the second encrypted message.

14. The computer-program product of claim 10, wherein the computer-program mechanism further includes instructions for determining the cryptographic key based on the shared secret.

15. The computer-program product of claim 10, wherein determining the cryptographic key involves a hash function.

16. The computer-program product of claim 15, wherein the hash function is predefined by the user and the other user.

17. The computer-program product of claim 10, wherein generating the first encrypted message involves a symmetric encryption technique.

18. The computer-program product of claim 10, wherein the secure connection includes a peer-to-peer connection between the electronic device and the other electronic device.

19. A computer system, comprising:

a processor;

memory; and a program module, wherein the program module is stored in the memory and configurable to be executed by the processor to establish a secure connection, the program module including:

instructions for computing a first hash value of a shared secret, wherein the shared secret was previously shared between a user of the electronic device and an other user of an other electronic device;

instructions for computing a second hash value of at least one of a machine address code, an international mobile equipment identity, or a random number;

instructions for generating a friendly name based on the first hash value and the second hash value;

instructions for advertising the name on a network, wherein the network includes the other electronic device;

instructions for receiving a first confirmation from the other electronic device that the friendly name was received by the other electronic device, wherein the first confirmation is sent by the other electronic device when the other electronic device detects that the received friendly name of the electronic device has a greater sort order than a corresponding friendly name of the other electronic device;

instructions for generating a first encrypted message from an unencrypted message using a cryptographic key;

instructions for providing the first encrypted message to the other electronic device;

instructions for receiving a second encrypted message from the other electronic device;

instructions for decrypting the second encrypted message using the cryptographic key; and instructions for receiving a second confirmation that the other electronic device was able to decrypt the first encrypted message, thereby confirming that the secure connection has been established.

* * * * *